(12) United States Patent
Zheng et al.

(10) Patent No.: US 7,972,406 B2
(45) Date of Patent: Jul. 5, 2011

(54) DIESEL PARTICULATE FILTER AND METHOD OF MAKING

(75) Inventors: Jing Zheng, Findlay, OH (US); Kirk Maxey, Toledo, OH (US)

(73) Assignee: Honeywell International Inc., Morristown, NJ (US)

( * ) Notice: Subject to any disclaimer, the term of this patent is extended or adjusted under 35 U.S.C. 154(b) by 341 days.

(21) Appl. No.: 12/189,524

(22) Filed: Aug. 11, 2008

(65) Prior Publication Data

US 2009/0038279 A1 Feb. 12, 2009

Related U.S. Application Data

(60) Provisional application No. 60/955,228, filed on Aug. 10, 2007, provisional application No. 60/955,035, filed on Aug. 9, 2007.

(51) Int. Cl.
  B01D 24/00 (2006.01)
  B01D 39/06 (2006.01)
  B01D 39/14 (2006.01)
  B01D 39/00 (2006.01)
  B31F 1/20 (2006.01)

(52) U.S. Cl. .......... 55/523; 55/522; 55/524; 55/498; 156/474

(58) Field of Classification Search .......... 55/522–524, 55/498; 156/474
See application file for complete search history.

(56) References Cited

U.S. PATENT DOCUMENTS

| | | | | |
|---|---|---|---|---|
| 3,127,341 A * | 3/1964 | Abeles | ............ | 210/493.3 |
| 3,397,793 A * | 8/1968 | MacDonnell | ............ | 210/457 |
| 4,130,487 A * | 12/1978 | Hunter et al. | ............ | 210/85 |
| 4,402,830 A * | 9/1983 | Pall | ............ | 210/457 |
| 4,619,674 A * | 10/1986 | Erdmannsdorfer | ............ | 55/486 |
| 4,873,069 A | 10/1989 | Weaver et al. | | |
| 4,902,319 A * | 2/1990 | Kato et al. | ............ | 55/523 |
| 5,034,023 A * | 7/1991 | Thompson | ............ | 205/634 |
| 5,039,413 A * | 8/1991 | Harwood et al. | ............ | 210/457 |
| 5,087,272 A | 2/1992 | Nixdorf | | |
| 5,500,029 A * | 3/1996 | Zievers et al. | ............ | 55/485 |
| 5,545,323 A * | 8/1996 | Koehler et al. | ............ | 210/493.2 |
| 5,814,219 A * | 9/1998 | Friedmann et al. | ............ | 210/493.3 |
| 5,855,781 A * | 1/1999 | Yorita et al. | ............ | 210/321.82 |
| 6,391,076 B1 * | 5/2002 | Jaroszczyk et al. | ............ | 55/498 |
| 6,702,941 B1 * | 3/2004 | Haq et al. | ............ | 210/315 |
| 6,716,275 B1 * | 4/2004 | Reed et al. | ............ | 96/10 |
| 6,910,589 B1 * | 6/2005 | Rose et al. | ............ | 210/484 |
| 6,913,059 B2 | 7/2005 | Nixdorf | | |
| 6,953,493 B2 * | 10/2005 | Nakayama et al. | ............ | 95/51 |
| 7,691,188 B2 * | 4/2010 | Weber et al. | ............ | 96/134 |
| 2002/0152732 A1 * | 10/2002 | Kallsen et al. | ............ | 55/482 |
| 2003/0121242 A1 * | 7/2003 | Rieger et al. | ............ | 55/493 |
| 2006/0213165 A1 * | 9/2006 | Isomura et al. | ............ | 55/523 |

(Continued)

OTHER PUBLICATIONS

Baldwin et al., U.S. Appl. No. 60/910,165, filed Apr. 4, 2007, Specification.*

(Continued)

*Primary Examiner* — Walter D Griffin
*Assistant Examiner* — Amber Orlando
(74) *Attorney, Agent, or Firm* — Cantor Colburn LLP

(57) ABSTRACT

A filter assembly for a diesel particulate filter, the filter assembly having: a first end disk; a second end disk; a center tube secured to the first end disk by a sealing glass; a filter media secured to the first end disk and the second end disk by a sealing glass.

12 Claims, 5 Drawing Sheets

U.S. PATENT DOCUMENTS

| | | |
|---|---|---|
| 2008/0196370 A1 | 8/2008 | Schramm et al. |
| 2008/0202084 A1* | 8/2008 | Lynch et al. ............... 55/493 |
| 2008/0209875 A1* | 9/2008 | Treier et al. ............... 55/498 |
| 2008/0236123 A1* | 10/2008 | Chen et al. ............... 55/523 |
| 2008/0245039 A1* | 10/2008 | Anderson et al. ............ 55/498 |
| 2008/0245234 A1* | 10/2008 | Baldwin et al. ............. 96/131 |

OTHER PUBLICATIONS

Lynch et al. U.S. Appl. No. 60/884,213, filed Jan. 9, 2007, Specification.*

* cited by examiner

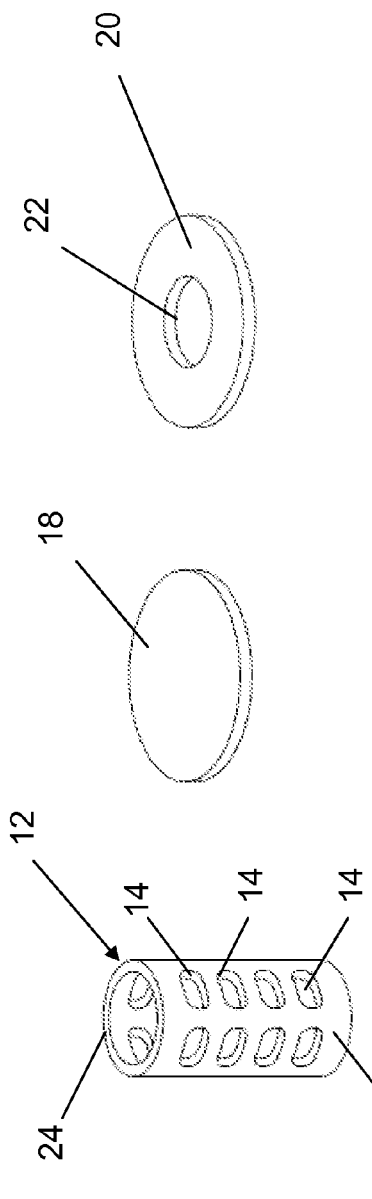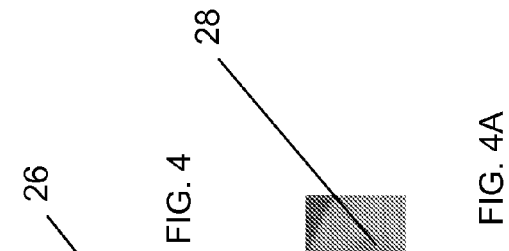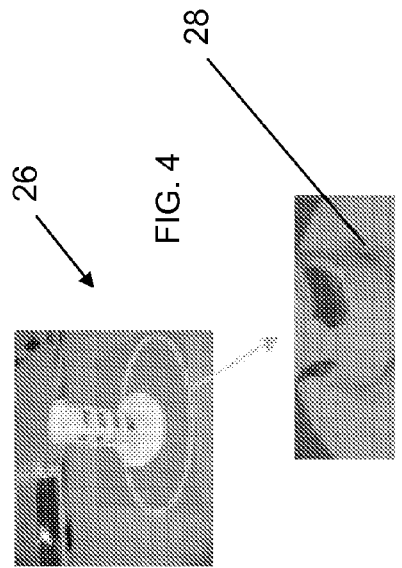
FIG. 2
FIG. 3
FIG. 4
FIG. 4A

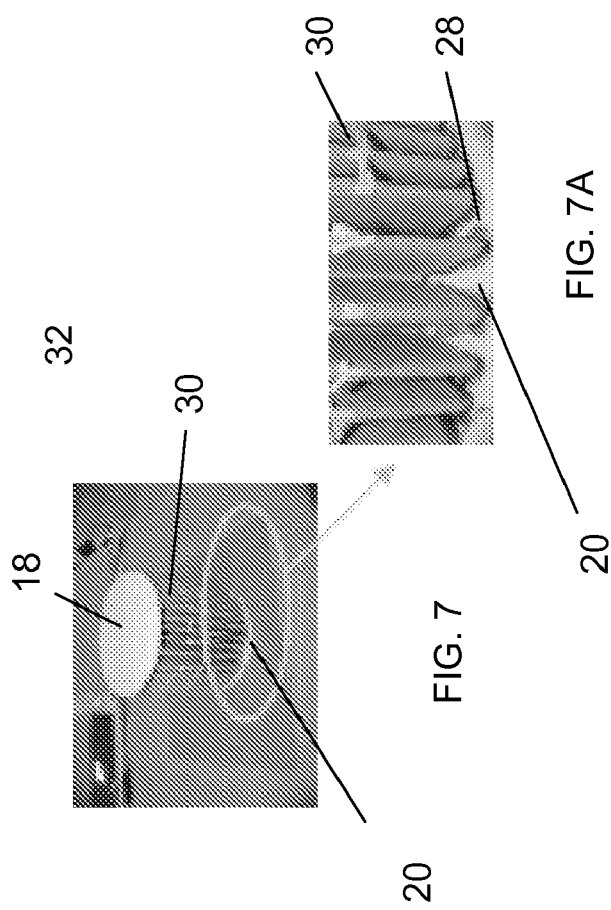
FIG. 7
FIG. 7A
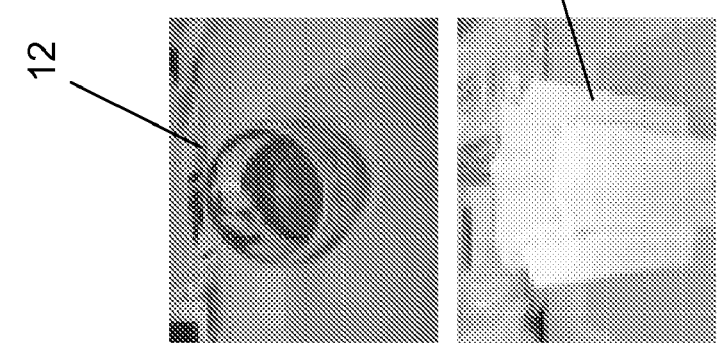
FIG. 5
FIG. 6

DIESEL PARTICULATE FILTER AND METHOD OF MAKING

CROSS REFERENCE TO RELATED APPLICATIONS

This application claims the benefit of U.S. provisional patent application Ser. No. 60/955,228 filed Aug. 10, 2007 and U.S. provisional patent application Ser. No. 60/955,035 filed Aug. 9, 2007 the contents each of which are incorporated herein by reference thereto.

BACKGROUND

The present invention relates to particulate filters for diesel exhaust systems. More particularly, the present invention relates to particulate filter assemblies that can be incorporated into diesel exhaust treatment devices.

Because regulatory agencies have recently mandated the reduction of particulate emissions in diesel engines, there has been increased activity in the development of diesel particulate filters, that is, exhaust emission filters for diesel engines. The role of a typical diesel particulate filter is to trap and remove the particulate components of the diesel exhaust stream, which include diesel soot and aerosols such as ash particulates, metallic abrasion particles, sulfates, and silicates, to prevent their discharge from the tailpipe.

Diesel particulate filters should provide long-term operation without diminishing the filtration efficiency of the filter and performance of the engine. Factors related to the performance of diesel particulate filters include but are not limited to high temperatures (e.g., up to 1400° C.), capability to store soot and ash, pressure loss, low thermal mass, stability, and durability. In addition, manufacturing costs and assembly volume are important considerations.

The filtration is achieved by a porous structure (e.g., filter media) that allows transmission of the fluid phase but stops or captures diesel particulate matter larger than a threshold particle size. Variations in the thermal characteristics of the frame and media materials of the diesel particulate filter has often run into problems of cracking. This is largely due to the thermal mismatch of the center tube and the casting materials as well as the low strength of both materials. This has been observed in diesel particulate filters that are formed by a co-casting process. Accordingly, it is desirable to provide a crack-free assembly for the diesel particulate filter.

SUMMARY OF THE INVENTION

In one exemplary embodiment a filter assembly of a diesel particulate filter is provided, the filter assembly comprising: a first end disk; a second end disk; a center tube secured to the first end disk by a sealing glass; a filter media secured to the first end disk and the second end disk by a sealing glass.

In another exemplary embodiment a method for making a diesel particulate filter assembly is provided, the method comprising: applying a sealing glass paste to a first end disk and an end of a center tube; firing the first end disk and the end of the center tube in an oven at a first temperature; applying a sealing glass paste to the first end disk and the end of a center tube after the first firing step; attaching the first end disk to the end of the center tube; firing the first end disk and the end of the center tube in an oven at a second temperature; dipping a first end of a pleated media in a sealing glass paste and covering the end of the media with the sealing glass paste; dipping a second end of the pleated media in a sealing glass paste and covering the second end of the media with the sealing glass paste; applying a layer of a sealing glass paste on a surface of the first end disk and a surface of a second end disk; applying the first end of the pleated media to the first end disk; applying the second end of the pleated media to the second end disk; and firing the assembly at a third temperature.

BRIEF DESCRIPTION OF THE DRAWINGS

FIG. 2 illustrates portions of a diesel particulate filter;

FIGS. 3, 4, 4A, 5 and 6 illustrate portions of a diesel particulate filter assembled in accordance with exemplary embodiments of the present invention;

FIGS. 7, 7A, 8A, 8B and 9 illustrate diesel particulate filters formed in accordance with exemplary embodiments of the present invention.

DETAILED DESCRIPTION OF EXEMPLARY EMBODIMENTS

Reference is made to the following United State Provisional Patent Applications, Ser. No. 60/884,215 filed Jan. 9, 2007 and Ser. No. 60/910,177 filed Apr. 4, 2007 and U.S. patent application Ser. No. 11/971,873 filed Jan. 9, 2008, the contents each of which are incorporated herein by reference thereto.

Figure 1:
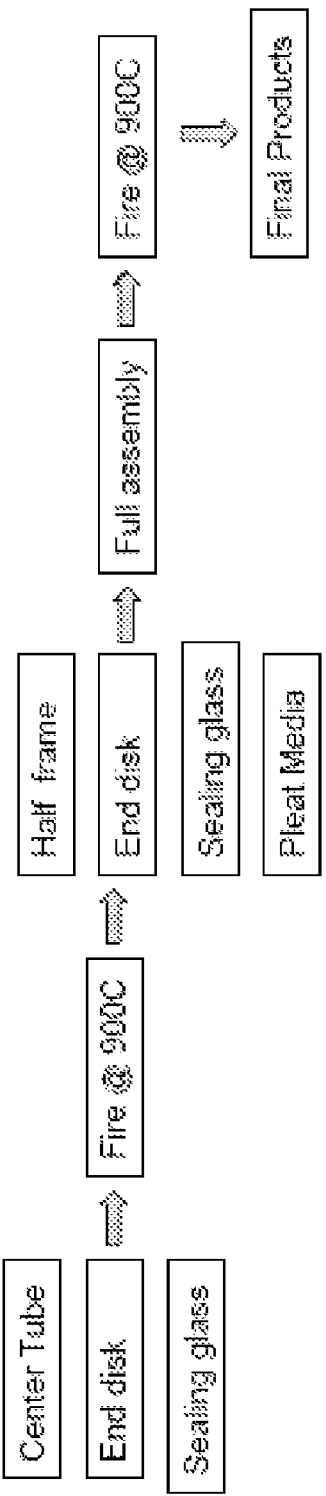
FIG. 1 illustrates a method of assembling a diesel particulate filter in accordance with an exemplary embodiment of the present invention.

Referring now to FIG. 1 and the supporting specification exemplary embodiments of the present invention utilize a glass ceramic as a binding agent to join pre-manufactured ceramic components together to make the diesel particulate filter (DPF) assemblies. In other embodiments, adhesives or various types of sealing glasses (e.g., alumina, silicon carbide, etc.) are used. During the assembly process the glass ceramic will be fired at the similar temperatures of the process for the media components and provide strong bonding between all the components namely, the end disks, the center tube and the pleated media. In one exemplary embodiment, the glass ceramic can be a sealing glass or glasses that are often used to seal alumina to alumina surfaces, glass/ceramic composites, cements and etc. Sealing glass is preferred because of its tailorable properties. In an alternative exemplary embodiment, and when the materials being sealed together comprise silicon carbide, the sealing glass would also comprise silicon carbide, or alternatively, an adhesive comprising silicon carbide can be used.

A non-limiting example of a suitable sealing glass for securing alumina containing components (e.g., end discs, center tube, etc.) together is a material containing, a solvent —(e.g., Terpineol and/or Texanol or equivalents thereof), a binder —(e.g., an organic polymer and/or acrylic polymer or equivalents thereof), a glass —(e.g., glass frit, borates, silicates, combinations thereof or equivalents thereof) and additives. One non-limiting example of a suitable sealing glass is commercially available as CL90-7863 available from Heraeus Inc. In accordance with an exemplary embodiment of the present invention Heraeus' CL90-7863 has been used to manufacture diesel particulate filters in accordance with an exemplary embodiment of the present invention. Of course, other suitable types of sealing glasses are contemplated for use in accordance with exemplary embodiments of the present invention. Alternatively, a glass ceramic is used.

In an alternative exemplary embodiment and when the end disks and center tubes comprise silicon carbide, a silicon carbide sealing glass is used. Accordingly, the materials of the components being secured together and the adhesive will all have a coefficient of thermal expansion that is similar thus, the commercial product (e.g., diesel particulate filter) will be less prone to cracking due to thermal expansion. One non-limiting example of a silicon carbide containing sealing glass is a material containing, a solvent —(e.g., Terpineol and/or Texanol or equivalents thereof), a binder —(e.g., an organic polymer and/or acrylic polymer or equivalents thereof), a glass —(e.g., glass frit, borates, silicates, combinations thereof or equivalents thereof) and additives. One non-limiting example of a suitable sealing glass is commercially available from Heraeus Inc. under the product description or name CL90-9080 and CL90-9109. In addition and in one alternative exemplary embodiment an adhesive comprising aluminum phosphate and silicon carbide powder is used. In this embodiment the adhesive would contain aluminum phosphates and/or aluminum silicate and SiC powder and water. Another non-limiting example would be an adhesive comprising silicon carbide powder and water. One non-limiting example of a contemplated adhesive is commercially available from Aremco under the product description or name 673-VGF.

The following is a simplified process for using such a glass ceramic or sealing glass to manufacture and assemble a diesel particulate filter (DPF) filter.

Apply the glass paste onto an end disk, which in one non-limiting exemplary embodiment would be alumina and an end of a center tube, which in one non-limiting exemplary embodiment would be 60% alumina. Of course, other materials are contemplated for comprising a portion of or a majority of the end disk and/or center tube. One non-limiting example is silicon carbide. Also, the sealing glass may be a silicon carbide (SiC).

Fire each of the end disk and center tube at 900 degrees Celsius of course, temperatures above and below 900 degrees are contemplated as long as the desired results are achieved. In accordance with an exemplary embodiment of the present invention, the paste can be applied using a spatula or any other suitable method. For example, it can also be applied using screen printing, spin coating or spraying.

After the first firing step, apply the glass paste again on the end disk and then attach the center tube to the end disk where the glass paste has been applied. Fire the assembly again to 900 degrees Celsius of course, temperatures above and below 900 degrees are contemplated as long as the desired results are achieved. After this firing step a half frame is provided (e.g., end disk and center tube).

Then, dip one end of the pleated media in the glass paste. Move the paste around to ensure that the glass paste covers the end of the media well. Flip the pleated media over and apply the glass paste to the other end of the media ensuring that the glass paste covers the other end of the media well.

Apply a layer of glass paste on the surface of both end disks (one previously secured to the center tube and one not) to facilitate intimate contact of the end disks and the end of the pleated media with the glass paste such that they are bonded together. Set one end of the pleated filter to the end disk and then put the other end disk to the other end of the filter. Apply a weight or force on top of the filter assembly and let the assembly sit to dry. (If necessary, a string or other fixtures can be used to maintain the shape of the filters).

Fire the assembly at 900° C.

The resultant assembly can then go through multiple binder applications on the filter media to obtain the end product.

A non-limiting exemplary embodiment of the present invention is illustrated in the attached drawings wherein the filter and assembly process is illustrated by the assembly flowchart 10 illustrated in FIG. 1.

FIG. 2 illustrates a center tube 12 with a plurality of openings 14 in its sidewall 16 and a first end disk 18 and a second end disk 20. As illustrated end disk 20 will have a central opening 22 that is configured to align with a central opening 24 of center tube 12. Once assembled, the diesel particulate filter will define a flow path through the filter media wherein the flow path is defined by openings 14 and central opening 22.

FIGS. 3 and 4 illustrate a half frame 26 wherein one of the end disks (18, 20) is secured to the center tube in accordance with the assembly process of exemplary embodiments of the present invention. FIG. 4A is an enlarged view of FIG. 4 illustrating the sealing glass 28 securing the center tube to an end disk.

FIG. 5 is a perspective view of a center tube 12 with a sealing glass applied thereto. FIG. 6 illustrates a filter media 30 before it is applied and secured to the half frame or another end disk. FIG. 7 illustrates an assembled diesel particulate filter 32 in accordance with an exemplary embodiment of the present invention wherein the filter media is secured to the half frame and the other end disk. FIG. 7A is an enlarged view of a portion of FIG. 7 illustrating the sealing glass 28 disposed between the filter media 30 and an end disk 20. It being understood that the interface between media 30 and end disk 18 would have a similar configuration.

Figure 8B:
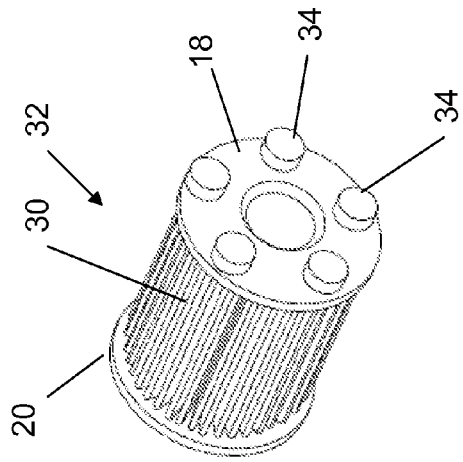
Figure 8A:
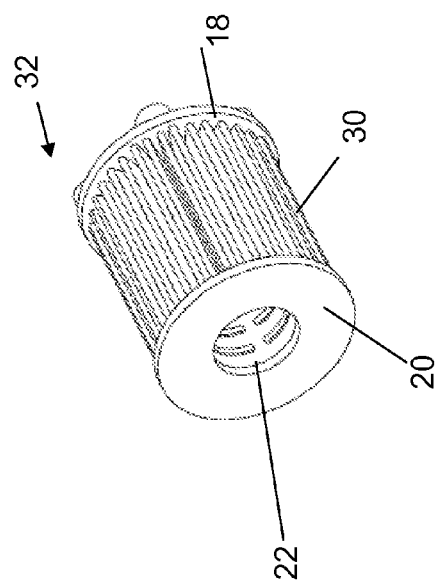

FIGS. 8A and 8B are perspective views of a diesel particulate filter 32 constructed in accordance with an exemplary embodiment of the present invention. In this embodiment end disk 18 is configured to have a plurality of protrusions 34, which can be used as locating features or standoffs for assembly of the diesel particulate filter into a housing (e.g., standoffs may locate the filter in housing and/or the standoffs will provide a flow path between the end disk and an inner wall of the housing the filter is received in.

Figure 9:
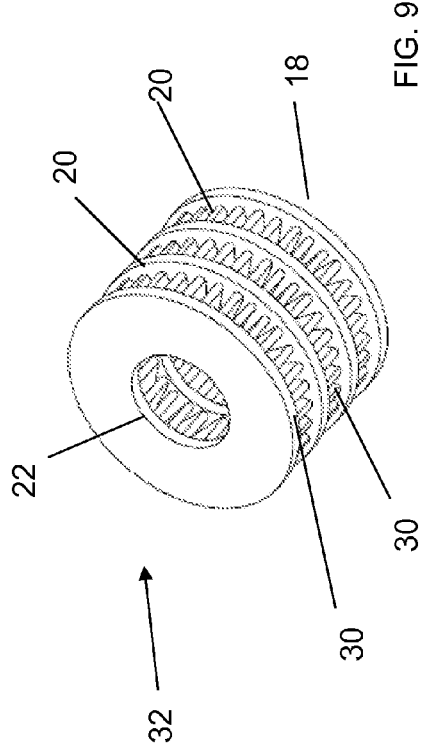

FIG. 9 illustrates an alternative exemplary embodiment where a plurality of end disks 20 each having a central opening 22 are secured to a plurality of media segments 30 in accordance with the assembly processes discussed herein and a single end disk 18 with no central opening is disposed on one end of the filter.

The exemplary filter assemblies described herein are configured to be incorporated within housing canisters to form exhaust treatment devices that are in fluid connection with the exhaust gas pipes of a diesel engine.

In one non-limiting exemplary embodiment, the filter element is disposed within and supported by the ceramic frame, and comprises silicon carbide that can be formed from a ceramic injection molding or casting process.

In accordance with an exemplary embodiment the ceramic frame may comprise any configuration and in one non-limiting exemplary embodiment constitutes silicon carbide and can be formed from a ceramic injection molding or casting process.

Non-limiting exemplary filter elements of the present invention can be constituted of a ceramic fiber material such as, for example, one comprising silicon carbide. Ceramic fibers, such as those described in U.S. Pat. No. 5,087,272, those described in U.S. Pat. No. 4,873,069, aluminum oxide fibers from Saffil of Berwyn, Pa., alumino silicate fibers from Thermal Ceramics of Augusta, Ga., or combinations thereof, are suitable for inclusion in a filter element of exemplary embodiments of the present invention. Thus, the ceramic fiber material may be selected from the group consisting of silicon carbide, silicon nitride, cordierite, aluminum oxide and alumina silicate, and combinations thereof. In accordance with another exemplary embodiment the media may be formed by the methods of U.S. Pat. No. 6,913,059 the contents of which are incorporated herein by reference thereto. Following formation of the ceramic fiber-based web, the fibers can be treated with a binder assist agent, dried, and at least partially bonded to neighboring fibers using the inorganic, preferably ceramic, binder. Each filter media can include multiple layers of filter media. The use of multiple media layers can increase the soot capacity of a filter element by overcoming the plugging that occurs in the top 20-30% of a single layer media, thereby enabling greater soot penetration and reducing regeneration frequency.

Exemplary embodiments of filter assemblies in accordance with the present invention may be applicable to an exhaust treatment device used for any combustion-type system such as, for example, an engine, a furnace, or any other system known in the art where the removal of gaseous compounds and/or particulate matter from an exhaust flow is desirable. It is also contemplated that such filter assemblies may be used with a non-combustion type system such as, for example, a dust collection system.

Frames for the individual diesel particulate filters could be made from a variety of materials in a variety of ways. For example, ceramic frames can be ceramic injection molded or cast to shape.

FIGS. 2-9 illustrate diesel particulate filters manufactured in accordance with exemplary embodiments of the present invention, wherein the end disks, center tube and media are secured to each other using glass paste or sealing glass to secure the items together. FIG. 9 illustrates a diesel particulate filter with multiple end disks and multiple media layers thus, additional steps would be required to secure all of the end disks together with the multiple media portions, wherein an outer end disk is located at either end of the diesel particulate filter. The filter illustrated in FIG. 9 may be made with or without a center tube.

In accordance with exemplary embodiments of the present invention, the composition of the sealing glass, glass ceramic, cements or adhesive used may vary and the composition of the materials the glass paste is applied to may also vary (e.g., including but not limited to metal oxides, carbides, nitrides, titanates or composites of these.) wherein the adhesive or glass paste is matched with the materials being secured together. In other words, the coefficient of thermal expansion of the adhesive or glass paste (e.g., alumina or silicon carbide) is matched with the materials (e.g., including but not limited to metal oxides, carbides, nitrides, titanates or composites of these) being secured together.

Figure 10:
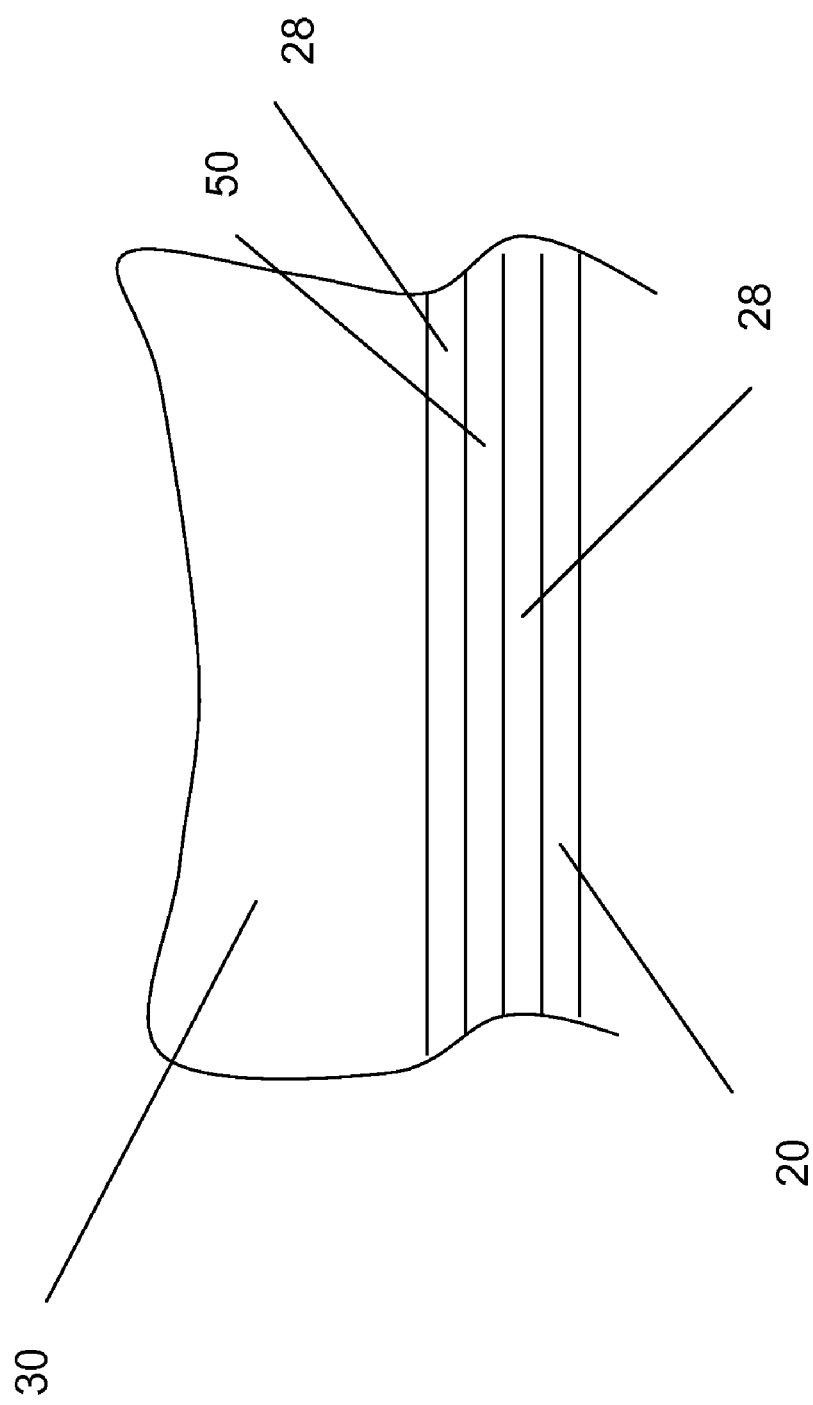
FIG. 10 illustrates a cross-sectional view of a portion of a diesel particulate filter constructed in accordance with an alternative exemplary embodiment of the present invention.

In still another alternative exemplary embodiment and referring now to FIG. 10, a cross-sectional view of a portion of a diesel particulate filter formed in accordance with exemplary embodiments of the present invention is illustrated. Here, an intermediary substrate layer 50 is applied to either the end disk, the center tube and/or the media, wherein the substrate layer 50 in conjunction with the sealing glass paste 28 secures the components of the diesel particulate filter together (e.g., the substrate layer 50 and the sealing glass paste 28 on either side of the substrate layer provide a transition layer between the materials of the end disk and the center tube and/or the filter media). It being understood that in various alternative exemplary embodiments, layer 50, sealing glass paste 28, the end disks, the media and the center tube may comprise materials of various compositions (e.g., silicon carbide, alumina, etc.) as long as differences between the coefficient of thermal expansion of the materials and the pastes and/or adhesives is minimized.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A filter assembly for a diesel particulate filter, the filter assembly comprising:
   a first end disk;
   a second end disk;
   a center tube secured to the first end disk by a sealing glass, glass ceramics, cements or adhesives; and
   a filter media secured to the first end disk and the second end disk by a sealing glass, glass ceramics, cements or adhesives, wherein the first end disk, the second end disk, the center tube and the filter media comprise an alumina and wherein the sealing glass, glass ceramics, cement or adhesives has a coefficient of thermal expansion that matches alumina.

2. A filter assembly for a diesel particulate filter, the filter assembly comprising:
   a first end disk;
   a second end disk;
   a center tube secured to the first end disk by a sealing glass, glass ceramics, cement or adhesives; and
   a filter media secured to the first end disk and the second end disk by a sealing glass, glass ceramics, cement or adhesives, wherein the first end disk, the second end disk, the center tube comprise ceramic materials and the filter media comprise a ceramic fiber material, wherein the ceramic material comprise a metal oxide, carbide, nitride or titanate or composite thereof and wherein the ceramic fiber material comprises silicon carbide, silicon nitride, cordierite, aluminum oxide or alumina silicate or a combination thereof and wherein the sealing glass, glass ceramics, cement or adhesives has a coefficient of thermal expansion that matches the ceramic materials.

3. The filter assembly as in claim 1, wherein the filter assembly is fired at or about 900 degrees Celsius.

4. A filter assembly for a diesel particulate filter, the filter assembly comprising:
   a first end disk;
   a second end disk;
   a center tube secured to the first end disk by a sealing glass, glass ceramics, cement or adhesives; and
   a filter media secured to the first end disk and the second end disk by a sealing glass, glass ceramics, cement or adhesives, wherein the first end disk, the second end disk, the center tube and the filter media are formed from a ceramic fiber material comprising silicon carbide and the sealing glass, glass ceramics, cement or adhesives has a coefficient of thermal expansion that matches silicon carbide.

5. A filter assembly for a diesel particulate filter, the filter assembly comprising:
 a first end disk;
 a second end disk;
 a center tube secured to the first end disk by a sealing glass; and
 a filter media secured to the first end disk and the second end disk by an adhesive, wherein the first end disk, the second end disk, the center tube and the filter media are formed from a ceramic fiber material comprising silicon carbide and the adhesives also comprises silicon carbide.

6. A method of making a diesel particulate filter, the method comprising:
 applying a sealing glass paste to a first end disk and an end of a center tube;
 firing the first end disk and the end of the center tube in an oven at a first temperature;
 applying a sealing glass paste to the first end disk and the end of a center tube after the first firing step;
 attaching the first end disk to the end of the center tube;
 firing the first end disk and the end of the center tube in an oven at a second temperature;
 dipping a first end of a pleated media in a sealing glass paste and covering the end of the media with the sealing glass paste;
 dipping a second end of the pleated media in a sealing glass paste and covering the second end of the media with the sealing glass paste;
 applying a layer of a sealing glass paste on a surface of the first end disk and a surface of a second end disk;
 applying the first end of the pleated media to the first end disk;
 applying the second end of the pleated media to the second end disk; and
 firing the assembly at a third temperature.

7. The method as in claim 6, wherein the first temperature, the second temperature and the third temperature are the same.

8. The method as in claim 6, wherein the first temperature, the second temperature and the third temperature are at or about 900 degrees Celsius.

9. A filter formed by the method of claim 6.

10. The filter assembly as in claim 2, wherein the filter assembly is fired at or about 900 degrees Celsius.

11. The filter assembly as in claim 4, wherein the filter assembly is fired at or about 900 degrees Celsius.

12. The filter assembly as in claim 5, wherein the filter assembly is fired at or about 900 degrees Celsius.

* * * * *